United States Patent
Shen et al.

(10) Patent No.: US 10,579,483 B2
(45) Date of Patent: Mar. 3, 2020

(54) STORING A COMPACT FLASH PHYSICAL-TO-HOST LOGICAL ADDRESS MAPPING TABLE ON POWER LOSS

(71) Applicant: Silicon Motion, Inc., Jhubei, Hsinchu County (TW)

(72) Inventors: Yang-Chih Shen, Jhubei (TW); Po-Sheng Chou, Jhubei (TW)

(73) Assignee: Silicon Motion, Inc., Jhubei (TW)

( * ) Notice: Subject to any disclaimer, the term of this patent is extended or adjusted under 35 U.S.C. 154(b) by 215 days.

(21) Appl. No.: 15/805,067

(22) Filed: Nov. 6, 2017

(65) Prior Publication Data

US 2018/0150357 A1    May 31, 2018

(30) Foreign Application Priority Data

Nov. 25, 2016   (TW) .............................. 105138978 A

(51) Int. Cl.
| | | |
|---|---|---|
| *G06F 11/14* | (2006.01) | |
| *G06F 1/30* | (2006.01) | |
| *G06F 11/07* | (2006.01) | |
| *G06F 12/1009* | (2016.01) | |

(52) U.S. Cl.
CPC ............ *G06F 11/1471* (2013.01); *G06F 1/30* (2013.01); *G06F 11/073* (2013.01); *G06F 11/0793* (2013.01); *G06F 12/1009* (2013.01); *G06F 2212/1028* (2013.01); *G06F 2212/7201* (2013.01)

(58) Field of Classification Search
CPC ............... G06F 11/073; G06F 11/0793; G06F 11/1441; G06F 11/1471; G06F 11/1402; G06F 12/10; G06F 12/1009; G06F 2212/1028; G06F 2212/1032; G06F 2212/7201
See application file for complete search history.

(56) References Cited

U.S. PATENT DOCUMENTS

| | | | | |
|---|---|---|---|---|
| 9,830,257 | B1 * | 11/2017 | Booth ................ | G06F 12/0246 |
| 2006/0156301 | A1 | 7/2006 | Hong et al. | |
| 2011/0131365 | A1 * | 6/2011 | Zhang ................ | G06F 11/1441 |
| | | | | 711/103 |
| 2011/0219259 | A1 * | 9/2011 | Frost ...................... | G06F 11/07 |
| | | | | 714/6.2 |
| 2011/0296123 | A1 * | 12/2011 | Adler .................. | G06F 12/0246 |
| | | | | 711/156 |

(Continued)

FOREIGN PATENT DOCUMENTS

| | | |
|---|---|---|
| CN | 101458659 A | 6/2009 |
| CN | 104881334 A | 9/2015 |

(Continued)

*Primary Examiner* — Gabriel Chu

(57) ABSTRACT

A data storage method includes steps of: selecting an active block to store data from a host; determining whether a power drop/loss event has occurred; when it is determined that a power drop/loss event has occurred, recording an index of the active block and an index of a last data-containing page in the active block; generating a primary F2H mapping table; and writing the primary F2H mapping table, the index of the active block and the index of the last data-containing page into a designated block. A data storage device and a data recovery program are also provided.

21 Claims, 5 Drawing Sheets

(56) References Cited

U.S. PATENT DOCUMENTS

| | | | |
|---|---|---|---|
| 2013/0145076 A1* | 6/2013 | Chiueh | G06F 11/1417 |
| | | | 711/103 |
| 2014/0101369 A1* | 4/2014 | Tomlin | G06F 12/0246 |
| | | | 711/103 |
| 2014/0195725 A1* | 7/2014 | Bennett | G06F 12/0246 |
| | | | 711/103 |
| 2016/0246530 A1* | 8/2016 | Mylavarapu | G06F 3/0625 |
| 2016/0274808 A1* | 9/2016 | Zhang | G06F 3/0619 |
| 2017/0322888 A1* | 11/2017 | Booth | G06F 3/0607 |
| 2018/0260319 A1* | 9/2018 | Thompson | G06F 12/0246 |

FOREIGN PATENT DOCUMENTS

| | | |
|---|---|---|
| TW | 517189 B | 1/2003 |
| TW | 201107970 A | 3/2011 |
| TW | 201411347 A | 3/2014 |
| TW | 201525691 A | 7/2015 |

* cited by examiner

STORING A COMPACT FLASH PHYSICAL-TO-HOST LOGICAL ADDRESS MAPPING TABLE ON POWER LOSS

FIELD OF THE INVENTION

The present invention relates to a technique for data storage, and more particularly to a method, a data storage device and a non-transitory computer readable medium for data storage and data recover.

BACKGROUND OF THE INVENTION

Conventionally, when a power drop/loss event has occurred during operation, a data storage device using non-volatile memory as a data storage medium is required to immediately generate a flash physical-to-host logical address (F2H) mapping table (hereinafter referred to as F2H mapping table) to establish the correspondence between the physical address and logical address (hereinafter referred to as correspondence) of user data, so as to avoid data loss. Thus, the F2H mapping table is extremely important for operation of the data storage device.

However, the data storage device needs to generate and store the F2H mapping table within a limited time when a power drop/loss event occurs. Therefore, it is quite important to generate a compact F2H mapping table and store the mapping table at an appropriate site so that user data can be retrieved based on the F2H mapping table when the data storage device is powered on again.

SUMMARY OF THE INVENTION

One objective of the present invention is to provide a data storage method for a data storage device, wherein the amount of data of an F2H mapping table generated by the data storage method is small.

Another objective of the present invention is to provide a data recovery program corresponding to the above-described data storage method.

Still another objective of the present invention is to provide a data storage device using the above-described method.

The present invention provides a data storage method for a data storage device. The data storage method includes steps of: selecting an active block to store data from a host; determining whether a power drop/loss event has occurred; when it is determined that a power drop/loss event has occurred, recording an index of the active block and an index of a last page having the data in the active block; generating a primary F2H mapping table; and writing the primary F2H mapping table, the index of the active block and the index of the last data-containing page into a designated block.

The present invention further provides a data storage method for a data storage device. The data storage method includes steps of: selecting an active block to store data from a host; determining whether a power drop/loss event has occurred; when it is determined that a power drop/loss event has occurred, determining whether another power drop/loss event has occurred in the active block; when it is determined that the other power drop/loss event has occurred, recording an index of the active block and a secondary index of a last data-containing page; generating a secondary F2H mapping table; and writing the secondary F2H mapping table, the index of the active block and the secondary index of the last data-containing page into a designated block.

The present invention further provides a non-transitory computer readable medium having a data recovery program for a data storage device. The data recovery program includes steps of: reading a designated block to obtain an F2H mapping table, an index of an active block and an index of a last data-containing page; determining whether a content of the F2H mapping table is consistent with the index of the active block and the index of the last data-containing page; when it is determined that the content of the F2H mapping table is consistent with the index of the active block and the index of the last data-containing page, storing the F2H mapping table to a volatile storage medium; and selecting the active block to store data from a host.

The present invention further provides a data storage device, which includes a non-volatile storage medium and a control unit. The control unit is configured to select an active block from the non-volatile storage medium to store data from a host, determine whether a power drop/loss event has occurred, record an index of the active block and an index of a last data-containing page in the active block when it is determined that the power drop/loss event has occurred, generate a primary F2H mapping table accordingly, and write the primary F2H mapping table, the index of the active block and the index of the last data-containing page into a designated block in the non-volatile storage medium.

In summary, in the present invention, since the primary and secondary F2H mapping tables generated by the control unit 210 when a power drop/loss event occurs record only with the correspondence of data in the data-containing page, the generated amount of data in the primary or secondary F2H mapping table of the present invention is less than that that in a complete F2H mapping table of the prior art. As a result, the amount of data in the primary and secondary F2H mapping tables is lowered, the time required for generating the F2H mapping tables is reduced, and the F2H mapping tables have better protection as the F2H mapping tables are stored in blocks having better data retention capacity.

BRIEF DESCRIPTION OF THE DRAWINGS

Other advantages, objectives and features of the present invention will become apparent from the following description referring to the attached drawings.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
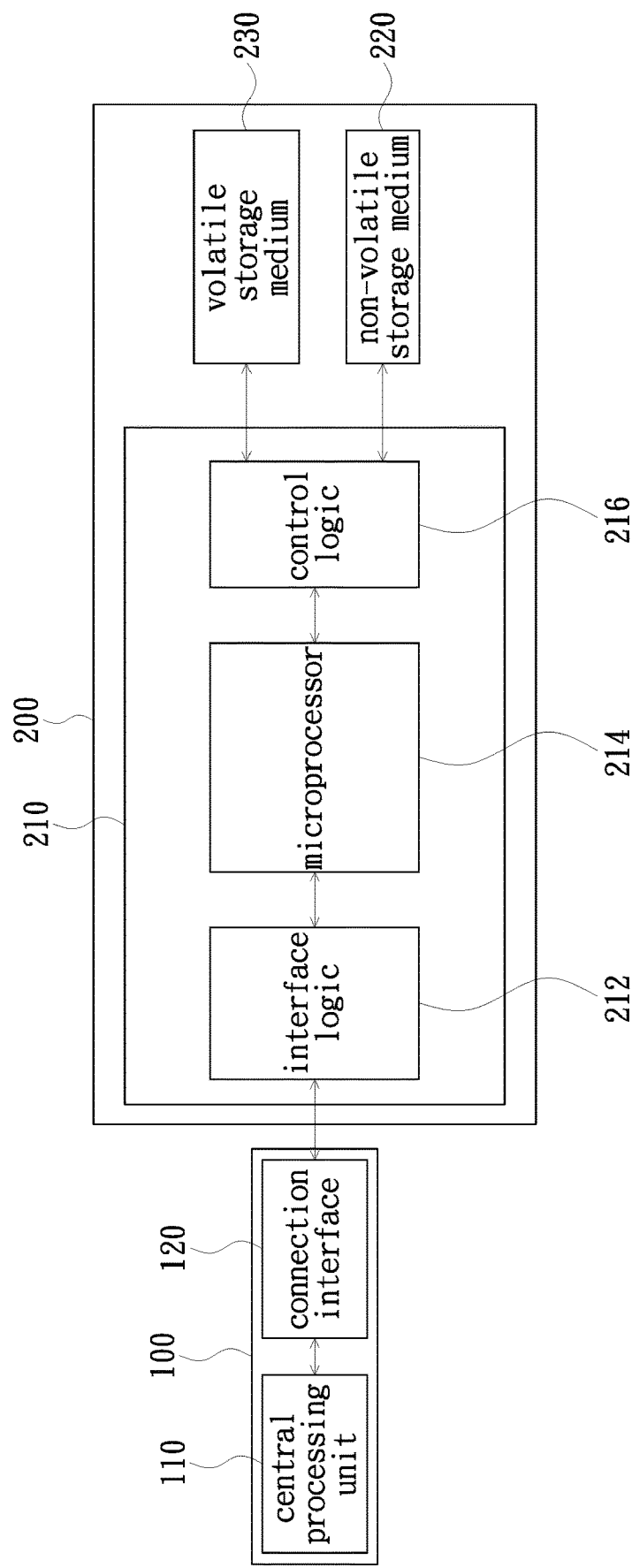
FIG. 1 depicts a data storage device in accordance with an embodiment of the present invention and its electrical coupling relationship with a host.

FIG. 1 depicts a data storage device in accordance with an embodiment of the present invention and its electrical coupling relationship with a host. Referring to FIG. 1, the host 100 mainly includes a central processing unit 110 and a connection interface 120. The connection interface 120 is adapted to electrically couple the data storage device 200 of the present embodiment. The central processing unit 110 is configured to transmit commands and data to the data storage device 200 via the connection interface 120. For example, the central processing unit 110 transmits a read command to the data storage device 200, or transmits a write command and data to be written into the data storage device 200 to the data storage device 200. In the present embodiment, the host 100 is implemented by a computer, a mobile phone, a tablet computer, a camera or other handheld electronic device having computing function.

The data storage device 200 mainly includes a control unit 210, a non-volatile storage medium 220 and a volatile storage medium 230. The control unit 210 is electrically coupled to the non-volatile storage medium 220 and the volatile storage medium 230. The control unit 210 is configured to control operations (e.g., data access or data erase) of the non-volatile storage medium 220 and the volatile storage medium 230. In the present embodiment, the non-volatile storage medium 220 is, for example, implemented by a flash memory, a magnetoresistive random access memory (RAM) or a ferroelectric RAM capable of long-term data storage. The following description is provided based on the non-volatile storage medium 220 being a flash memory, but the present invention is not limited thereto.

The volatile storage medium 230 is, for example, implemented by a dynamic random access memory (DRAM) or a static random access memory (SRAM) having data buffering function.

The control unit 210 mainly includes an interface logic 212, a microprocessor 214 and a control logic 216. The microprocessor 214 is electrically coupled to the interface logic 212 and the control logic 216. The microprocessor 214 is configured to access data in the non-volatile storage medium 220 and the volatile storage medium 230 via the control logic 216. The microprocessor 214 is further configured to receive commands or data from the host 100 via the interface logic 212; wherein the aforementioned commands or data are, for example, a write command, data to be written into the data storage device 200, a read command or an erase command.

Figure 2:
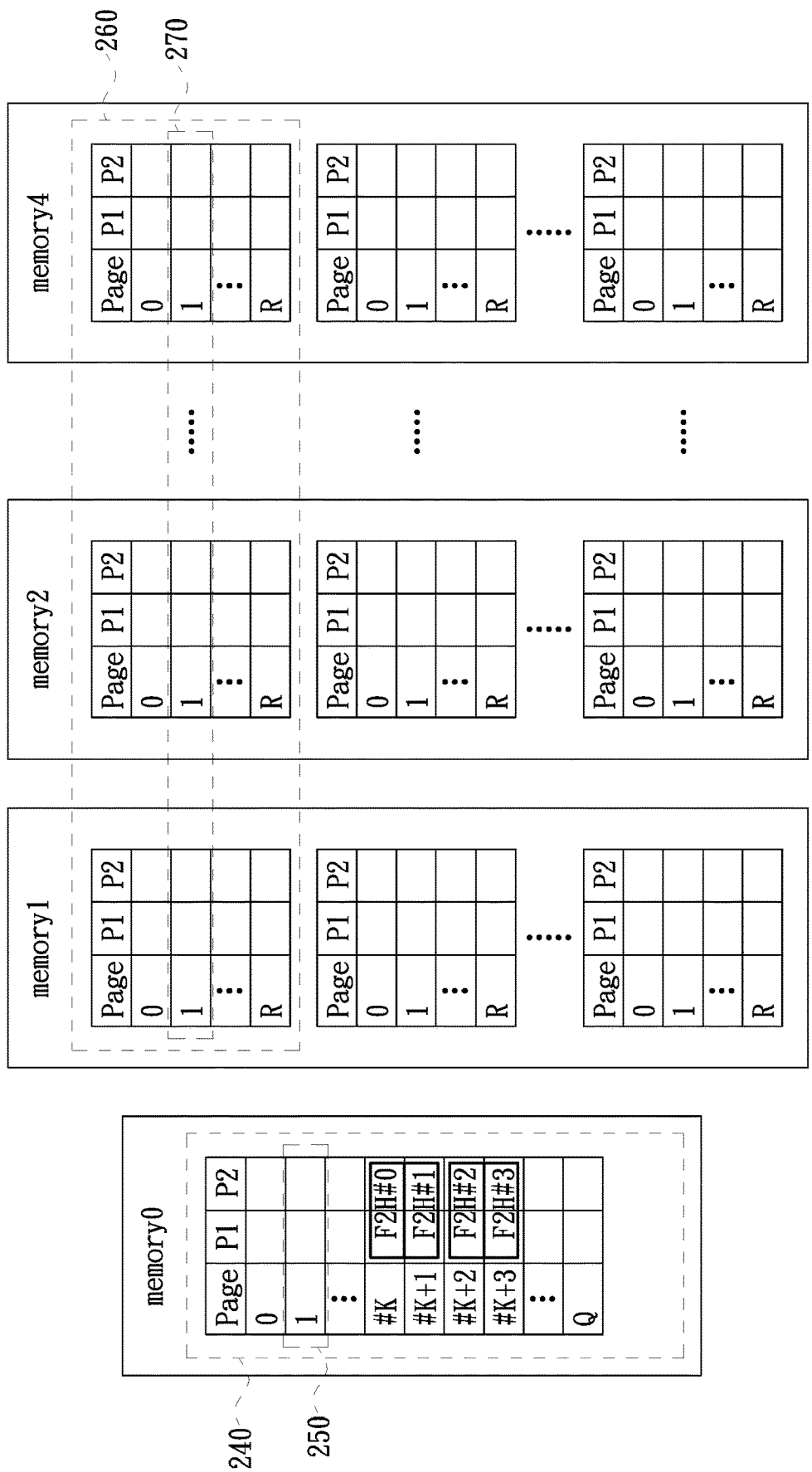
FIG. 2 depicts an implementation of a non-volatile storage medium in accordance with an embodiment of the present invention.

FIG. 2 depicts an implementation of the non-volatile storage medium 220 in accordance with an embodiment of the present invention. Referring to FIG. 2, the non-volatile storage medium 220 includes memories 0 to 4. The memory 0 is preferably a single-level cell (SLC) type flash memory that provides larger data access capability or better data integrity. The memory 0 can be used to store confidential data, protection data or management data. The aforementioned protection data includes user-defined security information (such as password) and debug logs, etc., wherein the debug log is preferably self-monitoring analysis and reporting technology (SMART) information. The memory 0 includes a plurality of SLC blocks 240, and each SLC block 240 preferably has two planes, denoted by planes P1 and P2 respectively. Each plane of the blocks 240 includes Q+1 physical pages; wherein Q is a natural number, for example, 256. The control unit 210 preferably is configured to simultaneously access the two corresponding pages of planes P1 and P2; wherein such operation mode is referred to as multi-plane access, and each of the two corresponding pages of planes P1 and P2 is logically considered as a multi-plane page 250. However, it is understood that the control unit 210 may access the two corresponding pages of planes P1 and P2 independently, which is an option in actual implementation and the present invention is not limited thereto.

The memories 1 to 4 are preferably a triple-level cell (TLC) type flash memory for storing user data. Each of the memories 1 to 4 includes a plurality of TLC blocks. Each TLC block has two planes, as denoted by planes P1 and P2 respectively, and supports multi-plane access. Each plane of the blocks in the memories 1 to 4 includes R+1 pages (or physical pages); wherein R is a natural number, for example, 2304. The control unit 210 preferably is configured to simultaneously access four corresponding TLC blocks in the respective memories 1 to 4; wherein the four corresponding TLC blocks in the respective memories 1 to 4 are logically considered as a super block 260, and every eight corresponding pages in the super block 260 is logically considered as a super page 270. However, it is understood that the control unit 210 selects only one of the four corresponding blocks in the respective memories 1 to 4 for access, which is an option for implementation and the present invention is not limited thereto.

In an implementation, the memory 0 may be a flash memory in binary mode that is switchable between a multi-level cell (MLC) flash memory or a TLC flash memory. The memories 1-4 may be MLC or SLC flash memories. The user can choose and switch the type of flash memories according to the actual needs, and the present invention is not limited thereto.

Figure 3:
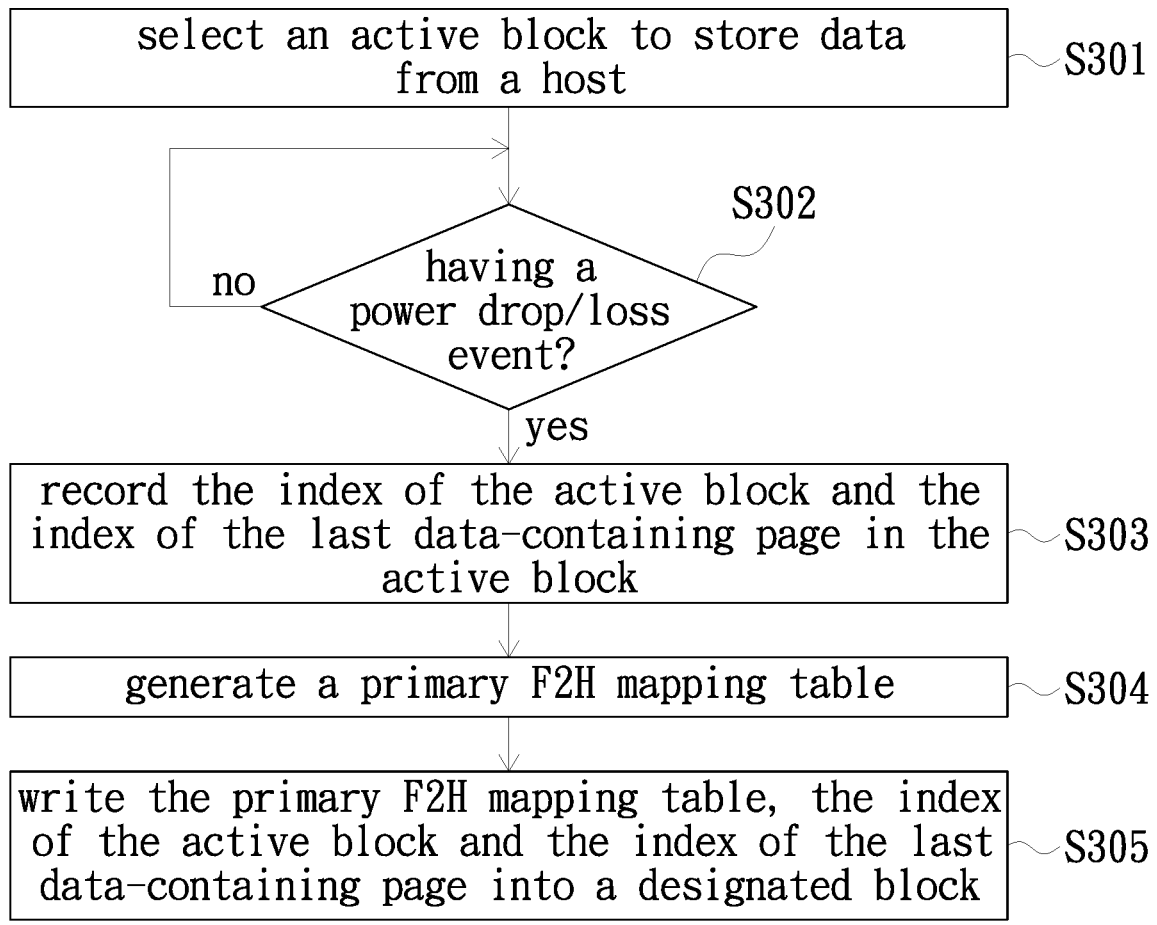
FIG. 3 is a flowchart of a data storage method in accordance with an embodiment of the present invention.

FIG. 3 is a flowchart of a data storage method in accordance with an embodiment of the present invention. Please refer to FIGS. 1 to 3. First, step S301: selecting an active block to store data from the host 100. Specifically, when the data storage device 200 receives a write command from the host 100, the control unit 210 of the data storage device 200 selects a super block 260 (e.g., super block #0) as an active block to store data from the host 100. The data from the host 100 is preferably stored to the super pages 270 in the super block #0 sequentially. For example, assuming that the super block #0 includes 2304 super pages 270, the data from the host 100 is preferably written starting from the super page #0 in the super block #0, followed by the super page #1, and so on. If the super block #0 is filled with data, the control unit 210 selects another super block 260 (e.g., super block #1) as an active block to store the subsequent data.

Thereafter, step S302: determining whether a power drop/loss event has occurred. Specifically, the control unit 210 continuously determines whether a power drop/loss event has occurred. A power drop/loss event may be triggered when the host 100 stops providing power to the data storage device 200 for any reason or asks the data storage device 200 to enter a specific power state to conserve power.

Thereafter, step S303: recording the index of the active block and the index of the last data-containing page in the active block. Specifically, assuming that the super page #63 in the super block #0 is the last super page completing or nearly completing data write when a power drop/loss event occurs, the super page #63 is referred to as the last data-containing super page 270; therefore, the control unit 210 records both of the index (i.e., 0) of the super block 260 and the index (i.e., 63) of the super page 270.

Thereafter, step S304: generating a primary F2H mapping table, wherein the primary F2H mapping table records the correspondence of the data in the last data-containing page and in all of the pages before the last data-containing page. For example, in the above example, the primary F2H mapping table records the correspondence of the data in the super page #63 of the super block #0 and in all of the super pages 270 before the super page #63 (i.e., the 64 super pages 270 from the super page #0 to the super page #63). As compared with a complete F2H mapping table generated by the conventional data storage method that needs to record the correspondence of all the data in the 2304 super pages 270 from the super page #0 to the super page #2303, the primary F2H mapping table generated by the data storage method of the present invention is only a part of the complete F2H mapping table in the prior art; therefore, not only the amount of data is lessened but the time required to generate the primary F2H mapping table is also shortened.

In step S304 of another embodiment, the primary F2H mapping table may record only the correspondence of the valid data in the last data-containing page and in all of the pages before the last data-containing page. For example, in the above example, if the last data-containing page is the super page #63 and assuming that the data stored in the super pages #0 to #63 are all valid data, the control section 210 then generates a primary F2H mapping table that records the correspondence of the data in the super pages #0 to #63, and the content of the primary F2H mapping table is identical to that in the previous embodiment. If the last data-containing page is the super page #63 and assuming that only the data stored in the super pages #60 to #63 are valid data, the control section 210 generates a primary F2H mapping table that records only the correspondence of the data in the super pages #60 to #63. Therefore, the size of the primary F2H mapping table of this embodiment is smaller than that of the previous embodiment. In summary, the amount of data in the primary F2H mapping table generated by this embodiment is smaller than that of a complete F2H table in prior art.

Thereafter, step S305: writing the primary F2H mapping table, the index of the active block and the index of the last data-containing page into a designated block; wherein the designated block and the active block are preferably of different block types, or the data storage capacity of each storage unit (or cell) in the designated block is not greater than that in the active block, or the designated block is not used to store data from the host 100. Specifically, in the above example, the control unit 210 writes the primary F2H mapping table, the index (i.e., 0) of the super block 260 and the index (i.e., 63) of the last data-containing super page 270 into the multi-plane page 250 in the SLC type block #0.

The complete F2H mapping table generated by the conventional data storage method records the correspondence of the data stored in the 2304 super pages 270 of the super block #0, and 72 multi-plane pages 250 in the SLC block #0 are required to store the complete F2H mapping table. Therefore, it is preferable to divide the complete F2H mapping table into 72 pieces so that each divided complete F2H mapping table can be stored to a page in the SLC block 240 and given an index, such as the indexes 0 to 71. For example, the first divided complete F2H mapping table is defined as F2H mapping table #0 and the 72th divided complete F2H mapping table is defined as F2H mapping table #71. Each divided complete F2H mapping table records the correspondence of the data stored in 32 super pages 270. In addition, each divided complete F2H mapping table may be stored in a plurality of pages of the SLC block 240. The operation principle is similar, and therefore no redundant detail is to be given herein. Since the size of the primary F2H mapping table and the multi-plane page 250 in the SLC block 240 is known, the control unit 210 may calculate the total number of multi-plane pages 250 needed to store the primary F2H mapping table, divide the primary F2H mapping table, and give an index to each divided complete F2H mapping table; wherein the index is consistent with the index of the divided complete F2H mapping table.

Since the primary F2H mapping table of the present invention is only a part of the complete F2H mapping table in the prior art and it is assumed that the primary F2H mapping table needs to be stored to two multi-plane pages 250 in the SLC block 240, the control unit 210 may divide the primary F2H mapping table and write the divided primary F2H mapping tables (e.g., F2H mapping tables #0 and #1) into the multi-plane pages #K and #(K+1), wherein K is also a natural number. Specifically, the F2H mapping tables #0 and #1 are stored in the two multi-plane pages 250 (i.e., multi-plane pages #K and #(K+1)), respectively. Preferably, the indexes (i.e., 0 and 1) of the F2H mapping tables #0 and #1 can be recorded in metadata of the multi-plane pages #K and #(K+1) respectively as the basis for further data validation. In addition, the index (i.e., 0) of the super block 260 and the index (i.e., 63) of the last data-containing super page 270 may be recorded in the metadata of the multi-plane pages #K and #(K+1) respectively as the basis for further data validation.

Since the reliability (i.e., the error rate) of SLC flash memory 240 is superior to the reliability of MLC flash memory and the reliability of MLC flash memory is superior to the reliability of TLC flash memory, the primary F2H mapping table generated in step S303 may be stored in the SLC block 240 so that the primary F2H mapping table is better protected.

Figure 4:
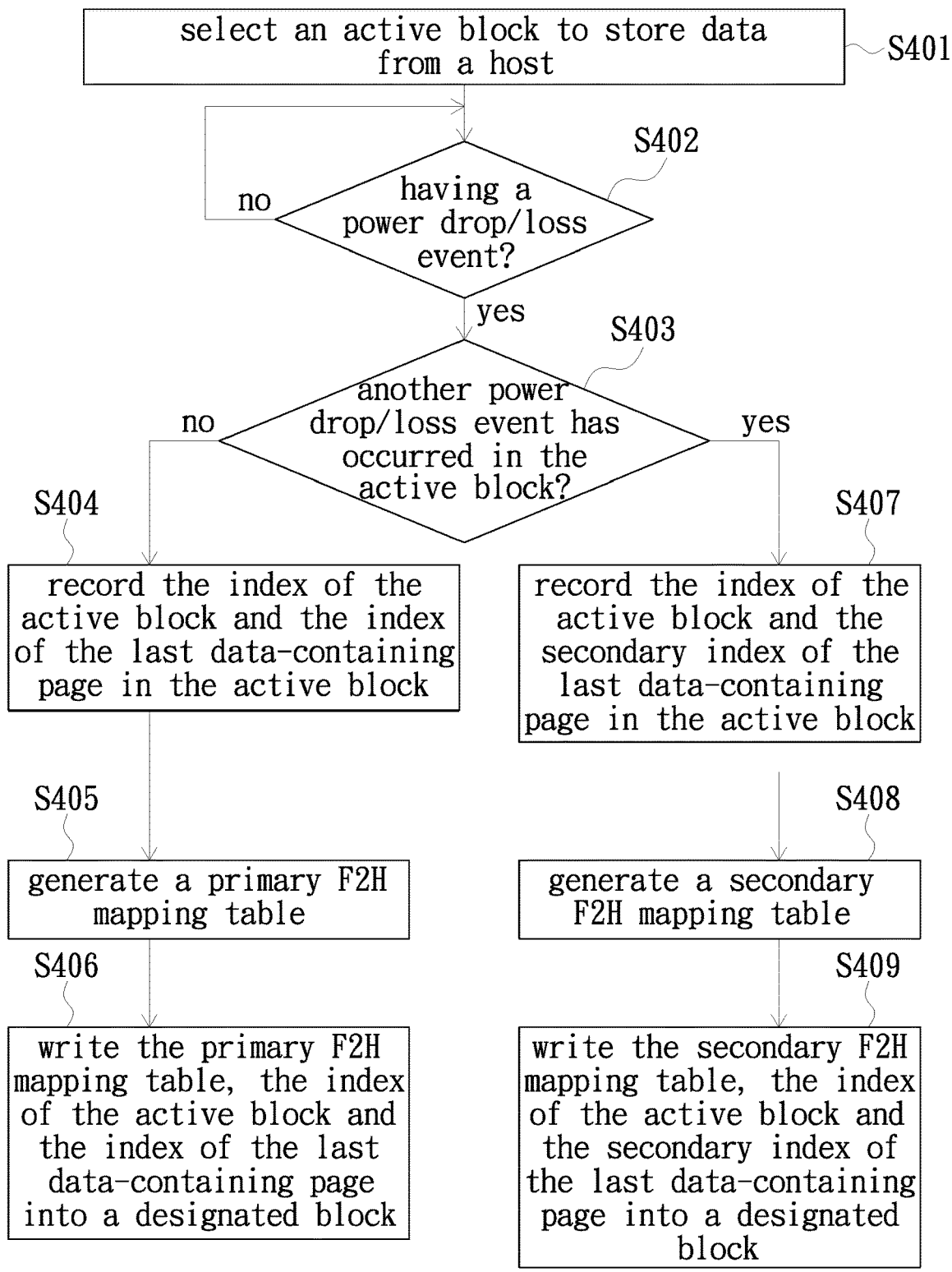
FIG. 4 is a flowchart of a data storage method in accordance with another embodiment of the present invention.

FIG. 4 is a flowchart of a data storage method in accordance with another embodiment of the present invention, wherein the embodiment of FIG. 4 is applicable to a situation in which multiple power drop/loss events occur on the same active block, as compared with the embodiment of FIG. 3. First, step S401: selecting an active block to store data from the host 100. Thereafter, step S402: determining whether a power drop/loss event has occurred. Since step S401 is identical to step S301, and step S402 is identical to step S302; no redundant detail is to be given herein.

Thereafter, step S403: determining whether another power drop/loss event has occurred in the active block if the determination in step S402 is YES. Specifically, in the above example, step S403 is for determining whether another power drop/loss event has occurred in the super block #0.

Thereafter, step S404: recording an index of the active block and a primary index of a last data-containing page in the active block if the determination in step S403 is NO. Thereafter, step S405: generating a primary F2H mapping table, wherein the primary F2H mapping table records the correspondence of data in the last data-containing page and in all of pages before the last data-containing page. Thereafter, step S406: writing the primary F2H mapping table, the index of the active block and the primary index of the last data-containing page into a designated block; wherein the designated block and the active block are preferably of different block types, or the data storage capacity of each storage unit in the designated block is not greater than that in the active block, or the designated block is not used to store data from the host 100. Since step S404 is similar to step S303, step S405 is identical to step S304, step S406 is similar to step S305 and the main difference is that the index of the last data-containing page in the present embodiment is changed to the primary index of the last data-containing page; no redundant detail is to be given herein.

Alternatively, step S407: recording the index of the active block and a secondary index of the last data-containing page if the determination in step S403 is YES. Herein, it is assumed that a power drop/loss event (referred to as the first power drop/loss event) has occurred in the super block #0, and the last data-containing super page 270 at that time is the super page #63. When a power another drop/loss event (referred to as the second power drop/loss event) occurs again and the last data-containing super page 270 at this time is the super page #127, the control unit 210 records the index (i.e., 0) of the super block 260 and the index (i.e., 127, the secondary index) of the super page 270.

Thereafter, step S408: generating a secondary F2H mapping table that records the correspondence of data in all pages between the primary index in step S404 and the secondary index in step S407. Specifically, the control unit 210 generates a secondary F2H mapping table. The secondary F2H mapping table records the correspondence of data in all super pages 270 between the index (i.e., 63) of the last data-containing super page 270 at the time of the first power drop/loss event and the index (i.e., 127) of the last data-containing super page 270 at the time of the second power drop/loss event. Since the secondary F2H mapping table records only the correspondence of the data in the 64 super pages 270 (from the super pages #64 to #127) in the super block #0 instead of the correspondence of the data in the 128 super pages 270 (from the super pages #0 to #127) in the super block #0, the control unit 210 can complete generation of the secondary F2H mapping table in a relatively short time.

Thereafter, step S409: writing the secondary F2H mapping table, the index of the active block and the secondary index of the last data-containing page into a designated block. Specifically, the control unit 210 writes the newly generated secondary F2H mapping table, the index (i.e., 0) of the super block 260 and the secondary index (i.e., 127) of the last data-containing super page 270 at the time of the second power drop/loss event to the multi-plane page 250 of the SLC block #0.

It is assumed that the secondary F2H mapping table recording the correspondence of data in the 64 super pages 270 (from the super pages #64 to #127) needs to be stored in the two multi-plane pages 250 of the SLC block 240, the control unit 210 may divide the secondary F2H mapping table and write the divided secondary F2H mapping tables (e.g., F2H mapping tables #2 and #3) into the multi-plane pages #(K+2) and #(K+3), respectively. Specifically, the F2H mapping tables #2 and #3 are stored in the two multi-plane pages 250 (i.e., multi-plane pages #(K+2) and #(K+3)), respectively. Preferably, the indexes (i.e., 2 and 3) of the F2H mapping tables #2 and #3, the index (i.e., 0) of the super block 260 and the index (i.e., 127) of the last data-containing super page 270 are recorded in the metadata of the multi-plane pages #(K+2) and #(K+3) as the basis for further data validation.

It is assumed that all of the data in the 64 super pages 270 (from the super pages #64 to #127) are not new data but are updated data, the indexes of the divided F2H mapping table may be repeated. For example, if the data stored in the super pages #64 to #127 contains 32 records of new data and the updated data of the super pages #0 to #3, then the secondary F2H mapping table contains the F2H mapping table #2 and the updated F2H mapping table #0. Therefore, the control unit 210 may store the F2H mapping table #2 and the updated F2H mapping table #0 to the multi-plane pages #(K+2) and #(K+3), respectively, and record the indexes (i.e., 2 and 0) of the F2H mapping table #2 and the updated F2H mapping table #0 in the metadata of the multi-plane pages #(K+2) and #(K+3) as the basis for further data validation. In addition, the index (i.e., 0) of the super block 260 and the index (i.e., 127) of the last data-containing super page 270 may be recorded in the metadata of the multi-plane pages #(K+2) and #(K+3) as the basis for further data validation.

Figure 5:
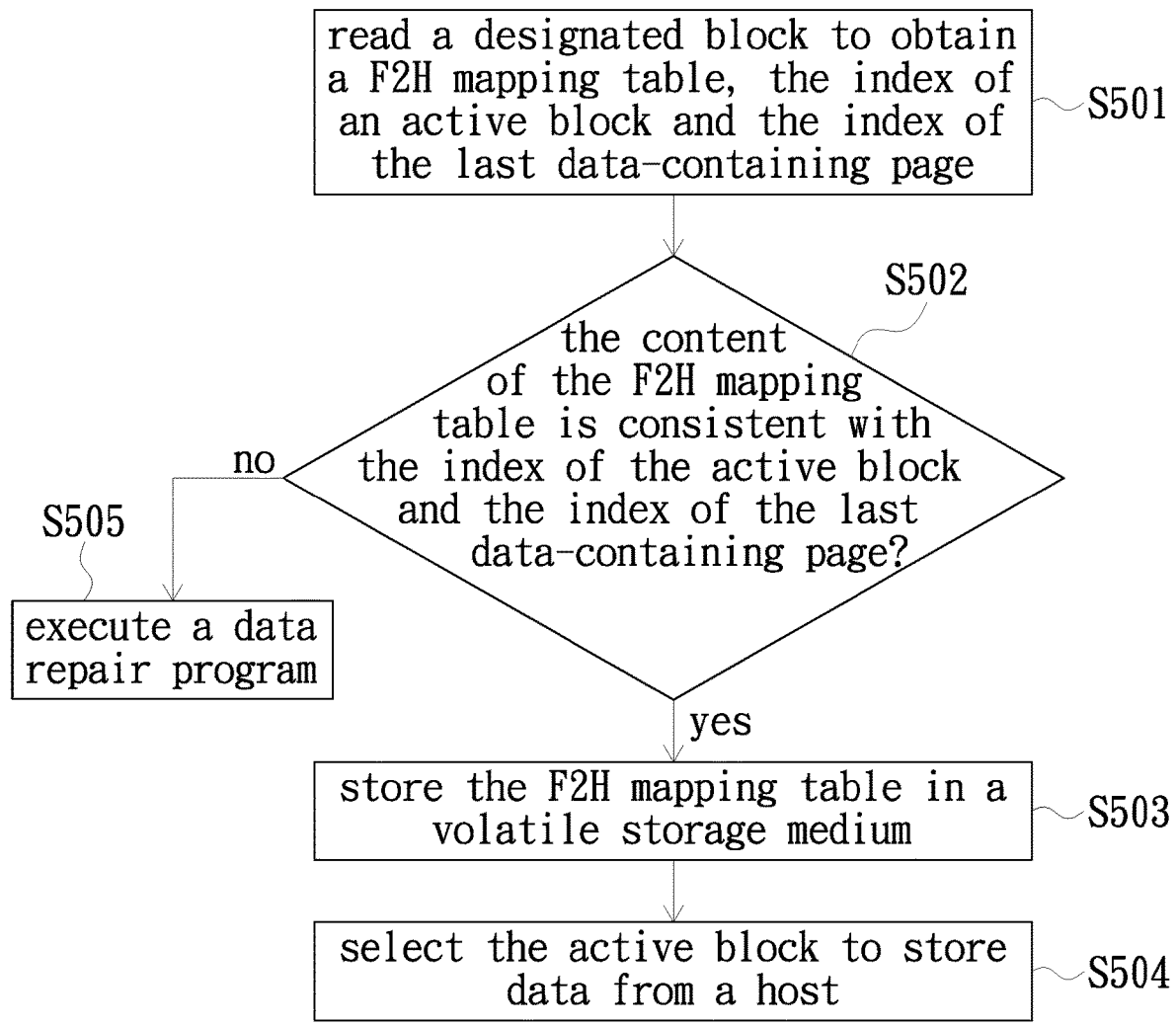
FIG. 5 is a flowchart of a data recovery program in accordance with an embodiment of the present invention.

FIG. 5 is a flowchart of a data recovery program in accordance with an embodiment of the present invention. The data recovery program of the present invention is applicable to the data storage device 200 so as to perform data recovery after power recovery. First, step S501: reading a designated block to obtain an F2H mapping table, an index of an active block and an index of a last data-containing page. Specifically, the control unit 210 reads the content of the SLC block 240 to obtain the F2H mapping table, for example, the primary F2H mapping table stored in step S305, or the primary F2H mapping table stored in step S406 and the secondary F2H mapping table stored in step S409.

Thereafter, step S502: determining whether the content of the F2H mapping table is consistent with the index of the active block and the index of the last data-containing page. Specifically, since the index of the F2H mapping table has been established, the total number of the divided F2H mapping tables can be obtained from the index of the F2H mapping table recorded in the metadata. Thereafter, a complete primary F2H mapping table and secondary F2H mapping table are obtained by determining the necessity to combine the divided F2H mapping tables. The content of the primary F2H mapping table and the secondary F2H mapping table itself contains the information of the index of the active block and the index of the last data-containing page (the primary index and the secondary index), and therefore, the control unit 210 can obtain the result of the aforementioned determination by comparing the data. Assuming that the active block recorded by the metadata is the super block #0 and the primary index and the secondary index of the last data-containing super page 270 are 63 and 127 respectively, the control unit 210 determines whether these indexes are consistent with the records of the primary F2H mapping table and the secondary F2H mapping table. If the F2H mapping table includes the primary F2H mapping table and the secondary F2H mapping table, as the secondary F2H mapping table records only the correspondence of new or updated data after the first power drop/loss event, the secondary F2H mapping table needs to be combined with the primary F2H mapping table to obtain a complete F2H mapping table and therefore to obtain the correspondence of data in all of the data-containing super pages 270 in the super block #0. If the index of the divided secondary F2H mapping table and the index of the divided primary F2H mapping table are repeated, such as the F2H mapping table #0 as described in the above example which indicates that the data in the super pages #0 to #31 have been updated after the first power drop/loss event, the correspondence of the data in the super pages #0 to #31 would be recorded based on the divided secondary F2H tables (i.e., the F2H mapping table #0).

Thereafter, step S503: storing the F2H mapping table in the volatile storage medium 230 if the determination in step S502 is YES. Specifically, the control unit 210 stores the primary F2H mapping table in the volatile storage medium 230 or stores both of the primary F2H mapping table and the secondary F2H mapping table in the volatile storage medium 230.

Thereafter, step S504, selecting the active block to store data from the host 100. For example, in the above example, the control unit 210 writes the subsequent data to the super block #0 since the super block #0 still has space to store data from the host 100. In the above example, if the F2H mapping table includes only the primary F2H mapping table, the subsequent data would be written into the super page #64 and the subsequent super pages 270. Alternatively, if the F2H mapping table includes both of the primary F2H mapping table and the secondary F2H mapping table, the subsequent data would be written into the super page #128 and the subsequent super pages 270.

In another embodiment, the control unit 210 writes the F2H mapping table into the active block in step S503 and selects another super block 260, such as the super block #1, as an active block to store the data from the host 100 in step S504. Alternatively, the control unit 210 writes the primary F2H mapping table and the secondary F2H mapping table into the active block in step S503 and selects another super block 260, such as the super block #1, as an active block to store the data from the host 100 in step S504. In the present embodiment, the super block #0 is turned off and the super block #1 is selected as the active block for that the super block #0 has suffered from the power drop/loss event before and its storage capacity may have been affected; as a result, the risk of data loss is reduced. Alternatively, step S505: executing, by the control unit 210, a data repair program if the determination in step S502 is NO. Since the data repair program is a conventional technique, no redundant detail is to be given herein.

In summary, in the present invention, since the primary and secondary F2H mapping tables generated by the control unit 210 when a power drop/loss event occurs record only with the correspondence of data in the data-containing page, the generated amount of data in the primary or secondary F2H mapping table of the present invention is less than that in a complete F2H mapping table of the prior art. As a result, the amount of data in the primary and secondary F2H mapping tables is lowered, the time required for generating the F2H mapping tables are reduced, and the F2H mapping tables have better protection as the F2H mapping tables are stored in blocks having better data retention capacity.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A data storage method for a data storage device, the data storage method comprising:
   selecting an active block to store data from a host;
   determining whether a power drop/loss event has occurred;
   when it is determined that the power drop/loss event has occurred, recording an index of the active block and an index of a last data-containing page in the active block;
   generating a primary flash physical-to-host logical address (F2H) mapping table; and
   writing the primary F2H mapping table, the index of the active block and the index of the last data-containing page into a designated block.

2. The data storage method according to claim 1, wherein the primary F2H mapping table records a correspondence of data in the last data-containing page and in all pages before the last data-containing page.

3. The data storage method according to claim 1, wherein the primary F2H mapping table records a correspondence of valid data in the last data-containing page and in all pages before the last data-containing page.

4. The data storage method according to claim 1, wherein the designated block and the active block are of different block types.

5. The data storage method according to claim 1, wherein a data storage capacity of each of a plurality of storage units in the designated block is not greater than a data storage capacity of each of a plurality of storage units in the active block.

6. The data storage method according to claim 1, further comprising:
   dividing the primary F2H mapping table;
   assigning an index to each of the divided primary F2H mapping tables; and
   writing the indexes of the divided primary F2H mapping tables into the designated block.

7. A data storage method for a data storage device, the data storage method comprising:
   selecting an active block to store data from a host;
   determining whether a power drop/loss event has occurred;
   when it is determined that a power drop/loss event has occurred, determining whether another power drop/loss event has occurred in the active block;
   when it is determined that the other power drop/loss event has occurred, recording an index of the active block and a secondary index of a last data-containing page;
   generating a secondary flash physical-to-host logical address (F2H) mapping table; and
   writing the secondary F2H mapping table, the index of the active block and the secondary index of the last data-containing page into a designated block.

8. The data storage method according to claim 7, wherein the secondary F2H mapping table records a correspondence of data in all pages between a primary index and the secondary index.

9. The data storage method according to claim 8, wherein the designated block further stores a primary F2H mapping table, and the primary F2H mapping table records a correspondence of data in all pages before the primary index.

10. The data storage method according to claim 8, wherein the designated block further stores a primary F2H mapping table, and the primary F2H mapping table records a correspondence of valid data in all pages before the primary index.

11. The data storage method according to claim 7, further comprising:
   dividing the secondary F2H mapping table;
   assigning an index to each of the divided secondary F2H mapping tables; and
   writing the indexes of the divided secondary F2H mapping tables into the designated block.

12. The data storage method according to claim 7, further comprising:
   dividing the primary F2H mapping table;
   assigning an index to each of the divided primary F2H mapping tables and;
   writing the indexes of the divided primary F2H mapping tables into the designated block.

13. A non-transitory computer readable medium having a data recovery program for a data storage device, the data recovery program comprising steps of:
   reading a designated block to obtain a flash physical-to-host logical address (F2H) mapping table, an index of an active block and an index of a last data-containing page;

determining whether a content of the F2H mapping table is consistent with the index of the active block and the index of the last data-containing page;

when it is determined that the content of the F2H mapping table is consistent with the index of the active block and the index of the last data-containing page, storing the F2H mapping table to a volatile storage medium; and selecting the active block to store data from a host.

14. The non-transitory computer readable medium according to claim 13, wherein the data recovery program further comprising:

when it is determined that the content of the F2H mapping table is not consistent with the index of the active block and the index of the last data-containing page, executing a data repair program.

15. The non-transitory computer readable medium according to claim 13, wherein the F2H mapping table records a correspondence of data in the last data-containing page and in all pages before the last data-containing page.

16. The non-transitory computer readable medium according to claim 13, wherein the F2H mapping table records a correspondence of valid data in the last data-containing page and in all pages before the last data-containing page.

17. The non-transitory computer readable medium according to claim 13, wherein a data storage capacity of each of a plurality of storage units in the designated block is not greater than a data storage capacity of each of a plurality of storage units in the active block.

18. A data storage device, comprising:

a non-volatile storage medium; and a microprocessor of a control unit, configured to select an active block from the non-volatile storage medium to store data from a host, determine whether a power drop/loss event has occurred, record an index of the active block and an index of a last data-containing page in the active block when it is determined that the power drop/loss event has occurred, generate a primary F2H mapping table accordingly, and write the primary flash physical-to-host logical address (F2H) mapping table, the index of the active block and the index of the last data-containing page into a designated block in the non-volatile storage medium.

19. The data storage device according to claim 18, wherein the primary F2H mapping table records a correspondence of data in the last data-containing page and in all pages before the last data-containing page.

20. The data storage device according to claim 18, wherein the primary F2H mapping table records a correspondence of valid data in the last data-containing page and in all pages before the last data-containing page.

21. The data storage device according to claim 18, wherein the microprocessor of the control unit is further configured to divide the primary F2H mapping table, assign an index to each of the divided primary F2H mapping tables, and write the indexes of the divided primary F2H mapping tables into the designated block.

* * * * *